(12) United States Patent
Amerga et al.

(10) Patent No.: US 7,286,801 B2
(45) Date of Patent: Oct. 23, 2007

(54) MAINTAINING AND SEARCHING SETS OF CELLS IN A WIRELESS COMMUNICATION SYSTEM

(75) Inventors: Messay Amerga, San Diego, CA (US); Chalapathi Rao Emani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 10/946,853

(22) Filed: Sep. 21, 2004

(65) Prior Publication Data

US 2005/0272425 A1 Dec. 8, 2005

Related U.S. Application Data

(60) Provisional application No. 60/572,912, filed on May 19, 2004.

(51) Int. Cl.
*H04B 17/00* (2006.01)
(52) U.S. Cl. .................. 455/67.11; 455/445; 455/446; 455/436; 455/524; 455/525; 455/449
(58) Field of Classification Search ............... 455/403, 455/436, 443, 455, 437, 434, 435.1, 440, 455/441, 446, 439, 442, 67.11, 524, 525, 455/513, 515, 449
See application file for complete search history.

(56) References Cited

U.S. PATENT DOCUMENTS

| | | | |
|---|---|---|---|
| 6,064,890 A * | 5/2000 | Hirose et al. ................ 455/513 |
| 6,360,098 B1 * | 3/2002 | Ganesh et al. .............. 455/436 |
| 6,385,460 B1 * | 5/2002 | Wan ............................ 455/515 |
| 6,917,809 B2 * | 7/2005 | Horwath et al. ............ 455/436 |
| 6,961,398 B2 * | 11/2005 | Dick et al. ................... 375/356 |
| 6,983,149 B2 * | 1/2006 | Lindquist et al. ........... 455/436 |
| 7,110,765 B2 * | 9/2006 | Amerga et al. .............. 455/436 |
| 2002/0168982 A1 | 11/2002 | Sorokine et al. ............ 455/442 |
| 2003/0040312 A1 | 2/2003 | Tohono ....................... 455/434 |
| 2003/0045300 A1 | 3/2003 | New ........................... 455/455 |
| 2004/0023634 A1 | 2/2004 | Jeong et al. ................. 455/403 |
| 2004/0235478 A1 * | 11/2004 | Lindquist et al. ........... 455/440 |
| 2006/0140117 A1 * | 6/2006 | Aerrabotu et al. .......... 370/232 |

FOREIGN PATENT DOCUMENTS

WO 03005759 1/2003

* cited by examiner

*Primary Examiner*—Matthew Anderson
*Assistant Examiner*—Sujatha Sharma
(74) *Attorney, Agent, or Firm*—Thomas R. Rouse; George C. Pappas; Kristina U. Ekwueme

(57) ABSTRACT

For cell measurement, a wireless device categorizes cells whose identities are known to the device into multiple sets. The wireless device may obtain these cells from the system via signaling and/or detect these cells via searches. Different sets of cells may be associated with different levels of importance (e.g., for handoff), require different amounts of processing for measurements, and so on. Each set is associated with a particular measurement rate. Cells deemed to be more important (e.g., for handoff) are measured more frequently. Cells deemed to be less important and/or require more processing for measurements (e.g., cells with unknown timing) are measured less frequently. The wireless device performs searches and makes measurements for the cells in each set at the measurement rate selected for that set.

40 Claims, 7 Drawing Sheets

MAINTAINING AND SEARCHING SETS OF CELLS IN A WIRELESS COMMUNICATION SYSTEM

CROSS-REFERENCES TO RELATED APPLICATIONS

The present application claims the benefit of U.S. Provisional Application Patent No. 60/572,912 filed May 19, 2004.

BACKGROUND

I. Field

The present invention relates generally to communication, and more specifically to techniques for making signal quality measurements for cells in a wireless communication system.

II. Background

In a wireless communication system, a wireless device may communicate with one or multiple "cells" at any given moment. A cell can refer to a base station or the coverage area of the base station, depending on the context in which the term is used. The cells in the system may be categorized as "serving" and "non-serving" cells. A serving cell is a cell that the wireless device is in communication with or is designated to receive messages from. A non-serving cell is a cell that is not a serving cell. A "neighbor" cell is a non-serving cell that may be near a serving cell and may be received by the wireless device.

The wireless device periodically makes signal quality measurements for the serving cell(s) as well as other cells in the system. The wireless device makes these measurements in order to determine whether there are any cells better than the current serving cell(s). This may be the case, for example, if the wireless device is mobile and moves about the system. If a better cell is found, as indicated by the measurements, then the wireless device may be handed from the current serving cell(s) over to the better cell, which would then become the new serving cell.

Cell measurements are important to ensure good performance for the wireless device and achieve high system efficiency. However, these measurements consume valuable resources (e.g., battery power) at the wireless device. There is therefore a need in the art for techniques to make cell measurements in an efficient manner in order to conserve resources.

SUMMARY

Techniques for making cell measurements in a wireless communication system are described herein. A wireless device categorizes cells whose identities are known to the device into multiple sets. The wireless device may obtain these cells from the system via signaling and/or detect these cells via searches. Different sets of cells may be associated with different levels of importance (e.g., for handoff), require different amounts of processing for measurements, and so on. Each set is associated with a particular measurement rate, which may be selected based on the characteristics of the set. For example, cells deemed to be more important (e.g., serving cells with which the wireless device communicates, or cells that are good candidates for serving the wireless device) are measured more frequently. Cells deemed to be less important and/or require more processing for measurements (e.g., cells with unknown timing) are measured less frequently. The wireless device performs searches and makes measurements for the cells in each set at the measurement rate selected for that set.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The cell measurement techniques described herein may be used for various wireless communication systems such as Code Division Multiple Access (CDMA) systems, Time Division Multiple Access (TDMA) systems, and Frequency Division Multiple Access (FDMA) systems. A CDMA system may implement W-CDMA, cdma2000, or some other CDMA radio access technology (RAT). cdma2000 covers IS-2000, IS-856, and IS-95 standards. A TDMA system may implement Global System for Mobile Communications (GSM) or some other TDMA RAT. W-CDMA and GSM are described in documents from a consortium named "3$^{rd}$ Generation Partnership Project" (3GPP). cdma2000 is described in documents from a consortium named "3$^{rd}$ Generation Partnership Project 2" (3GPP2). 3GPP and 3GPP2 documents are publicly available. The cell measurement techniques may also be used to measure cells for one or multiple wireless systems. For clarity, these techniques are described below for a W-CDMA system.

Figure 1:
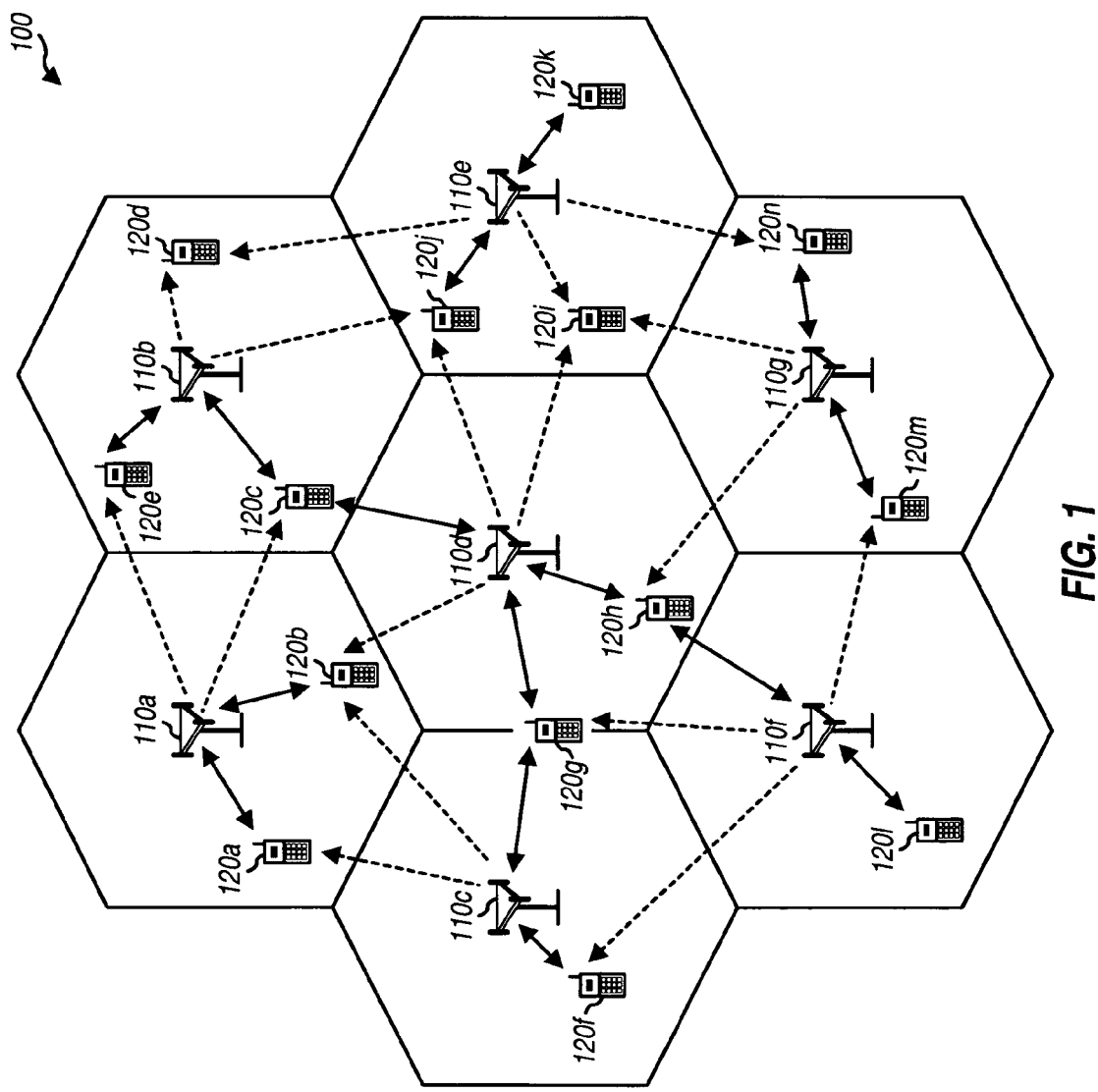
FIG. 1 shows a wireless communication system.

FIG. 1 shows a wireless communication system 100. System 100 includes a number of base stations 110 that support communication for a number of wireless devices 120. A base station is a fixed station used for communicating with the wireless devices and may also be called a Node B (W-CDMA terminology), a base transceiver station (BTS), an access point, or some other terminology. Wireless devices 120 are typically dispersed throughout the system, and each wireless device may be fixed or mobile. A wireless device may also be called a user equipment (UE) (W-CDMA terminology), a mobile station, a user terminal, or some other terminology.

In FIG. 1, a solid line with arrows on both ends indicates active communication between a wireless device and a base station. A dashed line with an arrow on one end indicates reception of pilot by a wireless device from a base station. A wireless device may communicate with one base station (e.g., wireless device 120a) or multiple base stations (e.g., wireless device 120g) on the downlink and uplink at any given moment. The downlink (or forward link) refers to the communication link from the base stations to the wireless devices, and the uplink (or reverse link) refers to the communication link from the wireless devices to the base stations.

System 100 may include many cells, where a cell may refer to a base station and/or its coverage area. A wireless device may be in active communication with one or multiple serving cells in a "connected" or "dedicated" mode of operation. The wireless device may also be designated to receive messages (e.g., pages) from one or multiple serving cells while in an "idle" mode. In any case, the wireless device may be able to receive signals from other cells besides the serving cell(s). For clarity, the following description is for the connected mode. However, the description also generally applies for the idle mode.

In W-CDMA as well as many other wireless systems, a wireless device performs initial acquisition and searches for cells when the device is first powered on. If any cells are found, then the wireless device exchanges signaling with these cells to inform the system of the device's presence and, if necessary, to set up a call. Via this signaling exchange, the wireless device obtains (1) an active set containing one or more cells to use for the call and (2) pertinent parameters for the radio link for each cell in the active set. The active set may contain one to six cells in W-CDMA. The cells in the active set are typically selected by the system based on inputs from the wireless device.

The wireless device may also obtain a list of neighbor cells, which are cells that may be received by the wireless device. This list may be called a neighbor list, a monitored set, and so on. In W-CDMA, the serving cell forms the neighbor list and sends the list to the wireless device via signaling. The neighbor list may contain up to 32 "intra-frequency" cells operating on the same frequency channel as the serving cell(s), up to 32 "inter-frequency" cells operating on frequency channels different from the frequency channel of the serving cell(s), and up to 32 inter-RAT cells of different radio access technology (e.g., GSM). Each cell also broadcasts a list of neighbor cells for that cell. The wireless device may then form a neighbor list for itself based on neighbor cell information obtained from all serving cells. In any case, depending on how the system is operated, the neighbor list obtained by the wireless device may be (1) fairly comprehensive and include many or all of the pertinent neighbor cells that may be received by the wireless device or (2) somewhat incomplete and omit some pertinent neighbor cells. The wireless device may thus detect neighbor cells that are not included in the neighbor list.

The wireless device may perform a "full" search to detect for the presence of a cell, determine the cell's timing, and make measurement for the cell. This full search is dependent on the system design, e.g., on how pilot and synchronization information, if any, are transmitted by each cell in the system. An exemplary full search for W-CDMA is described below. For most systems including W-CDMA, the full search is computationally intensive. In addition, for W-CDMA, the cells in the system may be operated asynchronously so that each cell may transmit on the downlink based on its timing, which may be different from the timing of other cells. For an asynchronous system, the wireless device would need to ascertain the timing of each individual cell.

The wireless device may perform a "list" search to make measurement for a cell whose timing is known to the wireless device. The list search is also dependent on the system design but is typically less computationally intensive than the full search. An exemplary list search for W-CDMA is described below. The list search can ascertain changes in the cell timing and discover new signal paths that may have been formed since the last measurement for the cell.

The wireless device periodically makes measurements for the serving cell(s) as well as non-serving cells in order to determine the best cell(s) from which to receive service. The wireless device may perform either a full search or a list search to make measurement for a cell, depending on whether timing for the cell is known. The terms "search" and "measurement" are thus related in the context of cell measurement and may be used interchangeably. The wireless device may be able to quickly and easily make measurement for a cell whose timing is known. The wireless device may need to perform a full search in order to make measurement for a cell whose timing is not known. The wireless device may thus expend different amounts of resources to make measurements for different cells.

Table 1 shows an embodiment of five different sets of cells that may be maintained by the wireless device.

TABLE 1

| Cell Set | Description |
| --- | --- |
| Active set | Contains serving cells that have assigned dedicated resources to the wireless device. |
| Candidate set | Contains cells from the Known Timing Neighbor set and the Unlisted set and which are strongly received by the wireless device. |
| Known Timing Neighbor set | Contains neighbor cells for which the wireless device has timing information. |
| Unknown Timing Neighbor set | Contains neighbor cells for which the wireless device does not have timing information. |
| Unlisted set | Contains cells that are detected by the wireless device but are not specified as neighbor cells by the network. The cells in this set are also called "detected" cells. |

Each cell that is identified by the wireless device may be categorized in one of the cell sets listed in Table 1. In general, fewer, more, and/or different cell sets may be defined, and this is within the scope of the invention. For example, multiple sets may be formed for candidate cells with different received signal quality.

Figure 2:
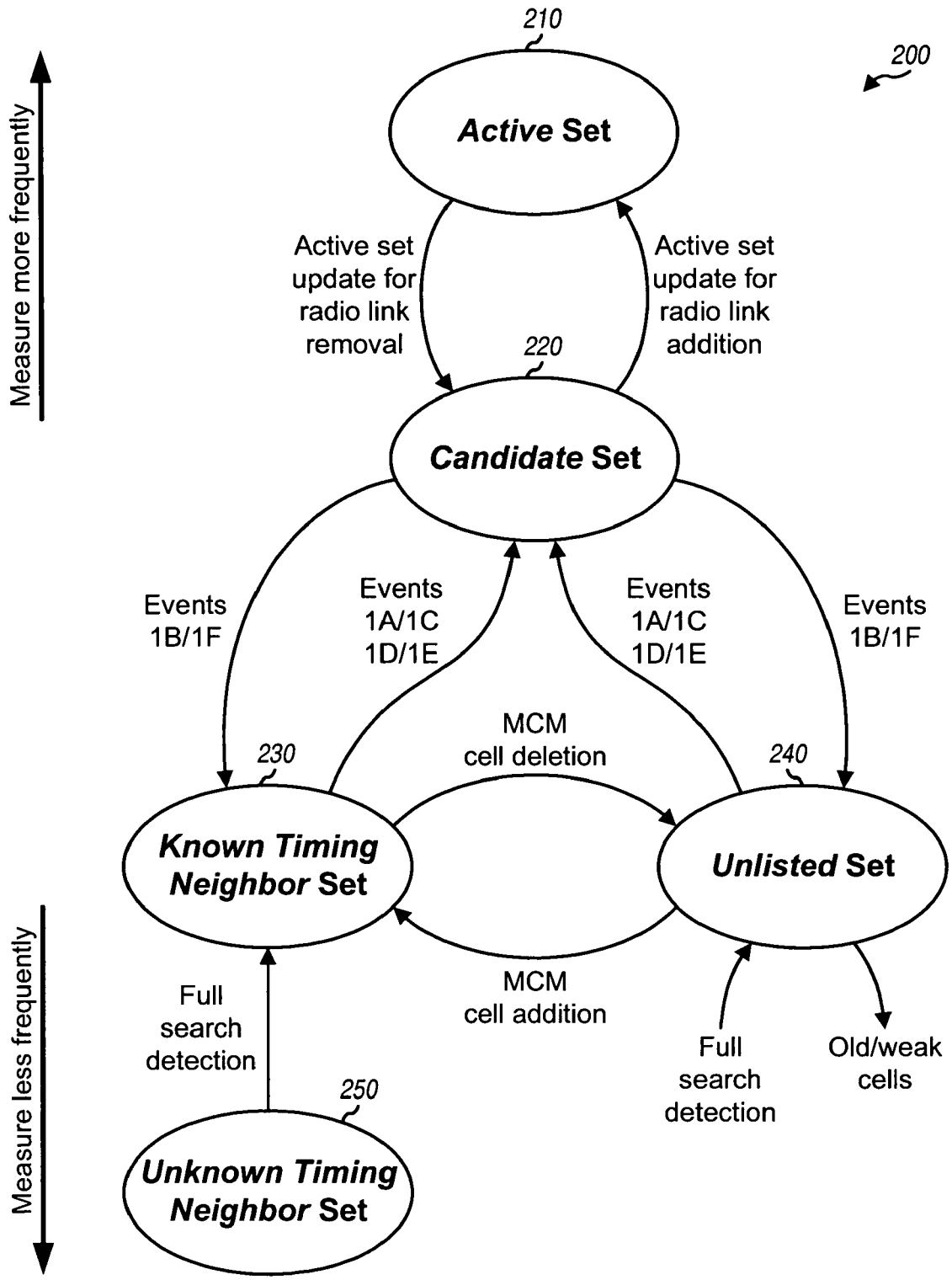
FIG. 2 shows a state diagram for five exemplary sets of cells.

FIG. 2 shows an exemplary state diagram 200 for the five cell sets shown in Table 1. The wireless device obtains a set of serving cells and a list of neighbor cells from the system for a call. The serving cells are placed in the Active set 210, and the neighbor cells in the neighbor list are initially placed in the Unknown Timing Neighbor set 250. The wireless device may perform a full search to detect for each neighbor cell in the Unknown Timing Neighbor set. The wireless device moves each neighbor cell that is detected by the full search to the Known Timing Neighbor set 230. In the process of performing full searches for neighbor cells, the wireless device may detect other cells that are not included in the neighbor list but are nevertheless received with sufficient signal quality by the wireless device. The wireless device places these detected cells in the Unlisted set 240.

The wireless device periodically makes measurements for cells that have been detected by the device and for which timing information is known to the device. The wireless device may move cells in the Known Timing Neighbor set and Unlisted set having sufficiently high received signal quality to the Candidate set 220. The wireless device may also send measurement reports to inform the system of these strong cells. For W-CDMA, the transition from the Known Timing Neighbor set and the Unlisted set to the Candidate set may be triggered by events 1A, 1C, 1D, and 1E, which are described below.

The system may update the cells in the Active set based on measurement reports sent by the wireless device. New cells (e.g., in the Candidate set) may be added to the Active set by performing an active set update (ASU) procedure for radio link addition. Conversely, current serving cells in the Active set may be removed by performing an active set update procedure for radio link removal. The active set update procedures for W-CDMA are described in a document 3GPP TS 25.331, entitled "RRC Protocol Specification," which is publicly available.

The wireless device may also place cells that have recently been removed from the Active set into the Candidate set. This is because (1) the wireless device was recently in communication with these cells and (2) there is higher likelihood of the wireless device communicating with these cells in the future. The wireless device may move cells in the Candidate set back to the Known Timing Neighbor set or the Unlisted set if the received signal quality for these cells is not sufficiently high. For W-CDMA, the transition from the Candidate set to the Known Timing Neighbor set and the Unlisted set may be triggered by events 1B and 1F, which are described below.

The wireless device may report the detected cells in the Unlisted set to the system by sending a Measurement Control Message (MCM) to the serving cell(s). If the system adds these detected cells to the neighbor list, then the wireless device moves these cells to the Known Timing Neighbor set. Conversely, if the system removes cells from the neighbor list but the wireless device continues to receive these cells with high received signal quality, then the wireless device may move these cells to the Unlisted set. If the system does not select cells outside of the neighbor list as serving cells, then the wireless device may keep the detected cells in the Unlisted set instead of moving these cells to the Candidate set.

In W-CDMA, each cell transmits a continuous pilot on a primary CPICH. This pilot is channelized (or orthogonalized) using a known channelization code assigned to the primary CPICH and further spectrally spread (or scrambled) with a primary scrambling code assigned to the cell. If the timing of the cell is known, then the wireless device can perform the complementary spectral despreading (or descrambling) and then make measurement for the signal quality of the pilot received on the primary CPICH. The received signal quality is also called received signal strength, received pilot strength, and so on, and may be quantified by an energy-per-chip-to-total-noise ratio (Ec/No) or some other quantity.

The wireless device may compare the received signal quality for the primary CPICH for a given cell against one or more values to ascertain the quality of that cell. For example, the wireless device may compare the received signal quality for the cell against a reporting range constant sent by the cell, an absolute threshold, the received signal quality for a serving cell, and so on.

Table 2 lists an exemplary set of events that may trigger transition between the Candidate, Known Timing Neighbor, and Unlisted sets. A cell in the Known Timing Neighbor set or the Unlisted set may transition to the Candidate set if the received signal quality for the primary CPICH for that cell is (1) higher than the reporting range constant (event 1A), (2) better than the primary CPICH for a serving cell (event 1C), (3) better than the primary CPICH for a previously best cell (event 1D), or (4) higher than the absolute threshold (event 1E). A cell in the Candidate set may transition back to the Known Timing Neighbor set or the Unlisted set if the primary CPICH for that cell is (1) lower than the reporting range constant (event 1B) or (2) lower than the absolute threshold (event 1F). The wireless device may send a measurement report to the serving cell(s) whenever any one of events 1A through 1F occurs. The wireless device may also periodically send measurement reports for cells that triggered events 1A and 1C. Events 1A through 1F are all based on received signal quality and are described in the aforementioned 3GPP document 3GPP TS 25.331.

TABLE 2

| Event | Description |
|---|---|
| 1A | Primary CPICH enters the reporting range. |
| 1B | Primary CPICH leaves the reporting range. |
| 1C | Primary CPICH for a non-serving cell becomes better than primary CPICH for a serving cell. |
| 1D | Change of best cell. |
| 1E | Primary CPICH becomes better than the absolute threshold. |
| 1F | Primary CPICH becomes worse than the absolute threshold. |

State diagram 200 also shows an exemplary hierarchy of various cells identified by the wireless device (e.g., based on signaling from the system and/or measurement by the wireless device). The serving cells in the Active set may be deemed the most important since they are the ones with which the wireless device communicates. The cells in the Candidate set may be deemed the next most important since they are good candidates for serving the wireless device. The candidate cells may be selected based on their current received signal quality, their past status (e.g., as recent serving cells), and/or other factors. The cells in the Known Timing Neighbor set and the Unlisted set may be deemed less important since they have not met the criterion or criteria for inclusion in the Candidate set. However, these cells may grow in importance, e.g., if the wireless device moves into the coverage of these cells. The cells in the Known Timing Neighbor set and the Unlisted set may be deemed to be equal in importance, as shown in FIG. 2. Alternatively, the cells in the Known Timing Neighbor set may be given greater importance than the cells in the Unlisted set, e.g., if the system only selects cells in the neighbor list for the Active set. The cells in the Unknown Timing Neighbor set may be deemed to be least important of all the cells identified by the wireless device. This is because not much information may be available for these cells except for their identities.

The wireless device may make measurements for different cells at different rates. Cells deemed to be more important may be measured more frequently, as indicated in FIG. 2. Cells that require more processing for measurement (e.g., for a full search) may be measured less frequently. The rate of measurement for each set of cells may be determined based on various factors such as the importance of the cells in the set, the amount of processing needed to perform the measurement, and so on. More interesting or pertinent cells may be measured more often.

The wireless device may perform a search for each serving cell at a frequent rate of $R_1$ to identify the best signal paths for processing. The wireless device may perform a search for each candidate cell at a frequent rate of $R_2$ to ensure that good candidates for (soft or hard) handoff are reported quickly to the system. The wireless device may perform a search for each cell in the Known Timing Neighbor set at a less frequent rate of $R_3$ to look for worthy cells to add to the Candidate set. The wireless device may perform a search for each cell in the Unlisted set at a rate of $R_4$ to look for cells to add to the Candidate set. The wireless device may perform a search for each cell in the Unknown Timing Neighbor set at an even less frequent rate of $R_5$ to look for cells identified by the system as well as cells not identified by the system.

In general, any measurement rate may be used for each cell set. The measurement rates for the five cell sets in FIG. 2 may conform to the following guideline: $R_1 \geq R_2 \geq R_3 \geq R_4 \geq R_5$. As a specific example, the wireless device may perform searches for serving cells at a rate of 50 searches per second (sps), i.e., $R_1=50$ sps, which is one search in every measurement period or interval of $P_1=20$ milli-seconds (ms) for each serving cell. The wireless device may also perform searches for candidate cells at a rate of $R_2=50$ sps. The wireless device may perform searches for cells in the Known Timing Neighbor set and the Unlisted set at a rate of $R_3=R_4=12.5$ sps, or one search in every measurement period of $P_3=P_4=80$ ms for each cell in these sets. The wireless device may perform searches for cells in the Unknown Timing Neighbor set at a rate of $R_5=3.125$ sps, or one search in every measurement period of $P_5=320$ ms for each cell in this set. Other measurement rates may also be used for these cell sets.

Figure 3:
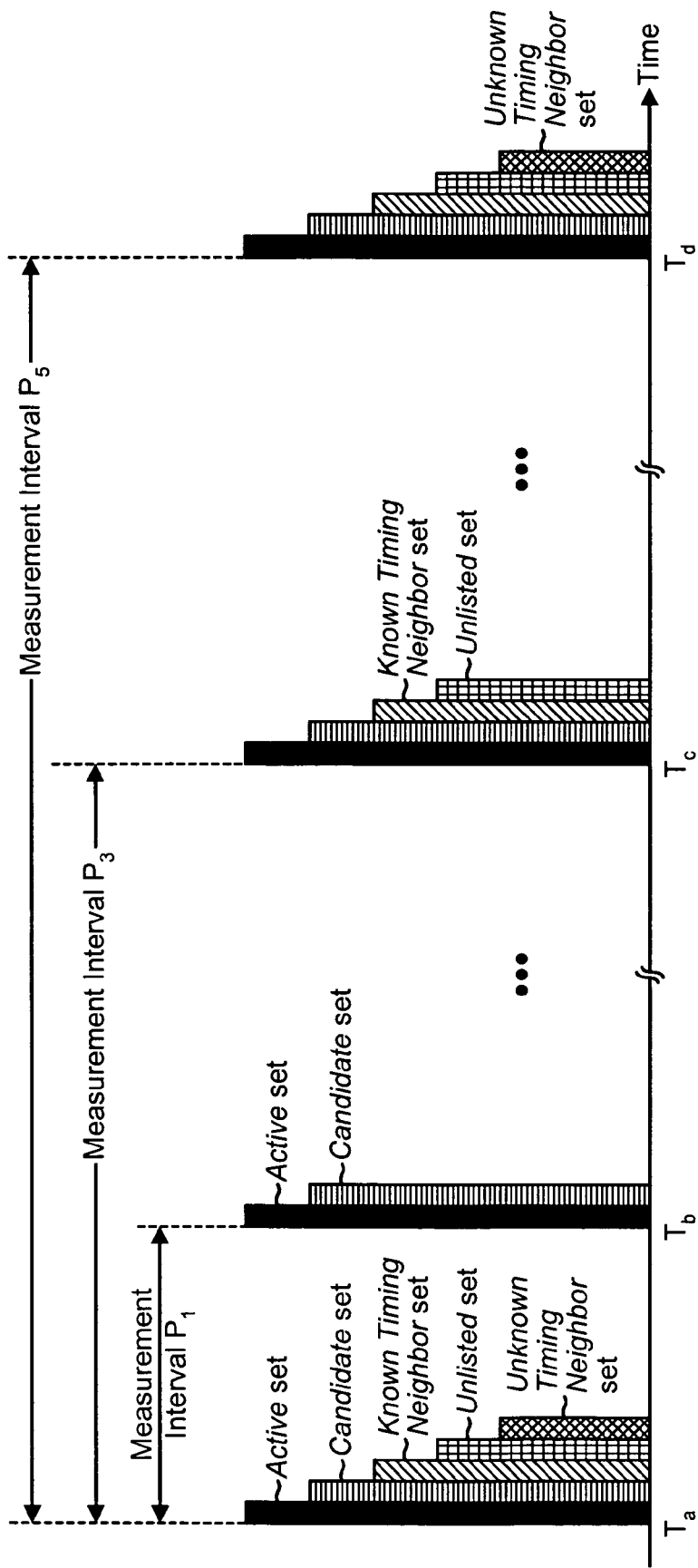
FIG. 3 shows a timeline for performing searches for the five cell sets.

FIG. 3 shows an exemplary timeline for performing searches for cells in the five sets shown in FIG. 2. In this example, the wireless device performs searches for the serving and candidate cells at the same rate, so that $R_1=R_2$ and $P_1=P_2$. The wireless device also performs searches for cells in the Known Timing Neighbor set and the Unlisted set at the same rate, so that $R_3=R_4$ and $P_3=P_4$. At time $T_a$, the wireless device performs (1) list searches for the serving cells in the Active set, the candidate cells in the Candidate set, the neighbor cells in the Known Timing Neighbor set, and the detected cells in the Unlisted set and (2) full searches for the neighbor cells in the Unknown Timing Neighbor set. The wireless device performs searches for the serving and candidate cells every $P_1$ ms thereafter (e.g., at time $T_b$). The wireless device performs searches for the cells in the Known Timing Neighbor set and the Unlisted set every $P_3$ ms thereafter (e.g., at time $T_c$). The wireless device performs full searches for the cells in the Unknown Timing Neighbor set every $P_5$ ms thereafter (e.g., at time $T_d$).

FIG. 3 shows the wireless device performing searches for all cells in each set at approximately the same time, or lumped together at times $T_a$, $T_b$, $T_c$ and $T_d$. The searches for the cells in each set may also be distributed over the measurement interval so that the processing is spread over time. For example, if the active set contains $N_1$ serving cells, then the wireless device may perform a search for a different serving cell every $P_1/N_1$ ms, so that all $N_1$ serving cells are searched every $P_1$ ms. The wireless device may similarly distribute the searches for the cells in each of the other sets.

Figure 4:
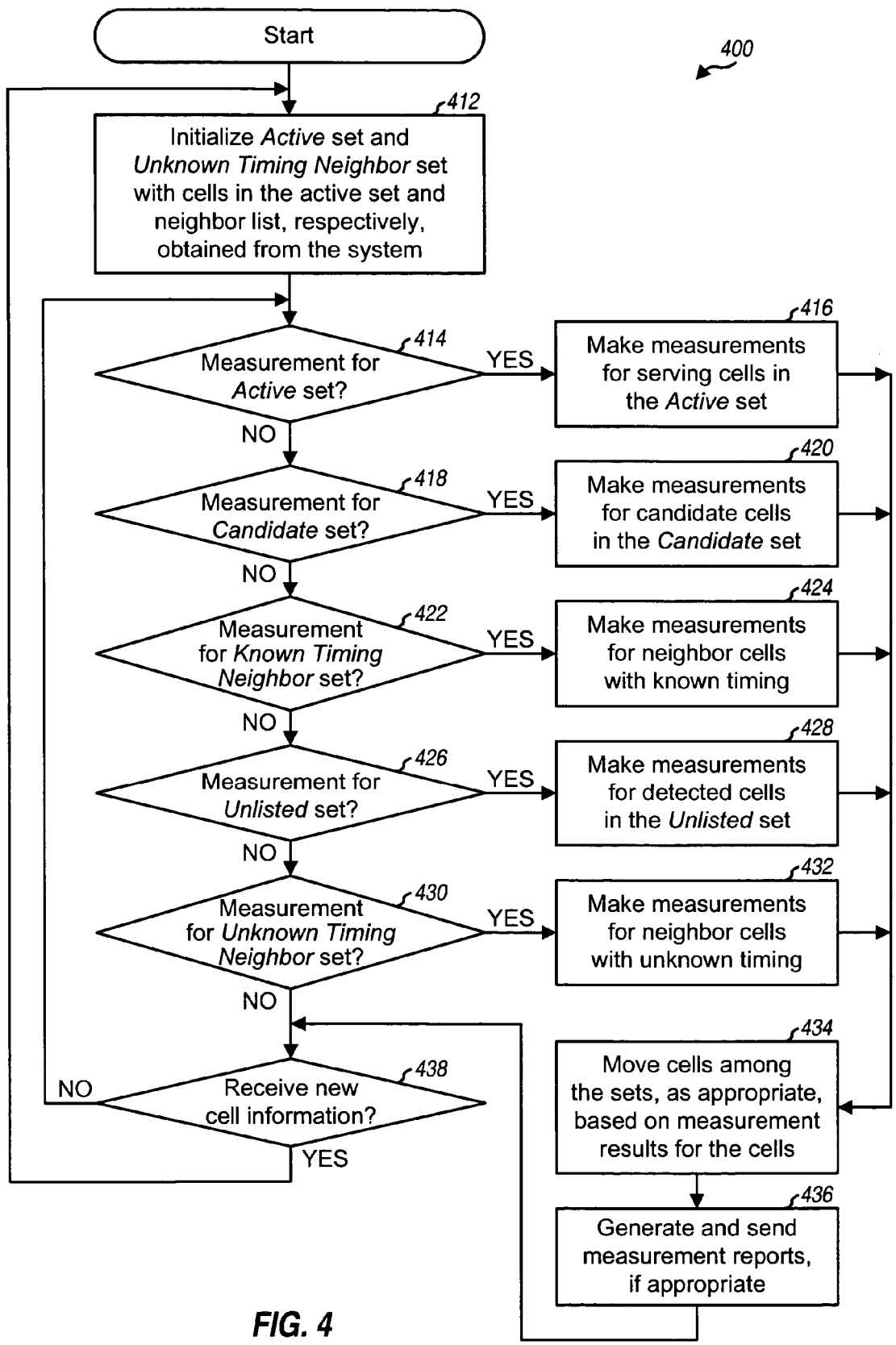
FIG. 4 shows a process for performing searches for the cells in the five sets.

FIG. 4 shows a flow diagram of a process 400 for performing searches for cells in the five sets shown in FIG. 2. The wireless device receives the active set and the neighbor list from the system and initializes the Active set and the Unknown Timing Neighbor set with the cells in the active set and the neighbor list, respectively (block 412). The Active set and Unknown Timing Neighbor set may also be initialized in other manners. The wireless device may initialize the other three cell sets to null or empty.

The wireless device thereafter performs measurement for the cells in the various sets at the rate selected for each set. If the time for making measurements for the Active set has arrived (as determined in block 414), then the wireless device makes measurements for the serving cell(s) in the Active set (block 416) and then proceeds to block 434. If the measurement time for the Candidate set has arrived and this set is not empty (as determined in block 418), then the wireless device makes measurements for the candidate cells (block 420) and then proceeds to block 434. If the measurement time for the Known Timing Neighbor set has arrived and this set is not empty (as determined in block 422), then the wireless device makes measurements for the neighbor cells in this set (block 424) and then proceeds to block 434. If the measurement time for the Unlisted set has arrived and this set is not empty (as determined in block 426), then the wireless device makes measurements for the detected cells in this set (block 428) and then proceeds to block 434. If the measurement time for the Unknown Timing Neighbor set has arrived and this set is not empty (as determined in block 430), then the wireless device makes measurements for the neighbor cells in this set (block 432) and then proceeds to block 434. If the measurement time for none of the cell sets has arrived (as determined in blocks 414, 418, 422, 426, and 430), then the wireless device proceeds to block 438.

In block 434, the wireless device receives measurement results and moves the cells among the sets, as appropriate, based on the measurement results for these cells (e.g., as shown in FIG. 2). The wireless device also generates and sends measurement reports, if appropriate (block 436). The wireless device then determines whether new cell information (e.g., a new active set or neighbor list) has been received from the system (block 438). If the answer is 'yes', then the wireless device returns to block 412 and reinitializes the cell sets. Otherwise, the wireless device returns to block 414 and continues to make cell measurement.

FIG. 4 shows a specific embodiment for performing cell measurements with multiple sets. Block 412 initializes the cell sets. Blocks 414 through 432 categorize the cells in the system and perform measurements for cells in different sets at different rates selected for these sets. The cell measurements may also be performed in other manners different from that shown in FIG. 4. Block 434 updates the cell sets based on the measurement results.

The Unlisted set contains cells that are not included in the neighbor list but are nevertheless detected by the wireless device. For W-CDMA, there are 8192 possible scrambling codes, of which 512 are primary scrambling codes. The number of detected cells may potentially be large. To reduce complexity, the Unlisted set may be limited to L detected cells, where L may be any value, e.g., L=10.

Figure 5:
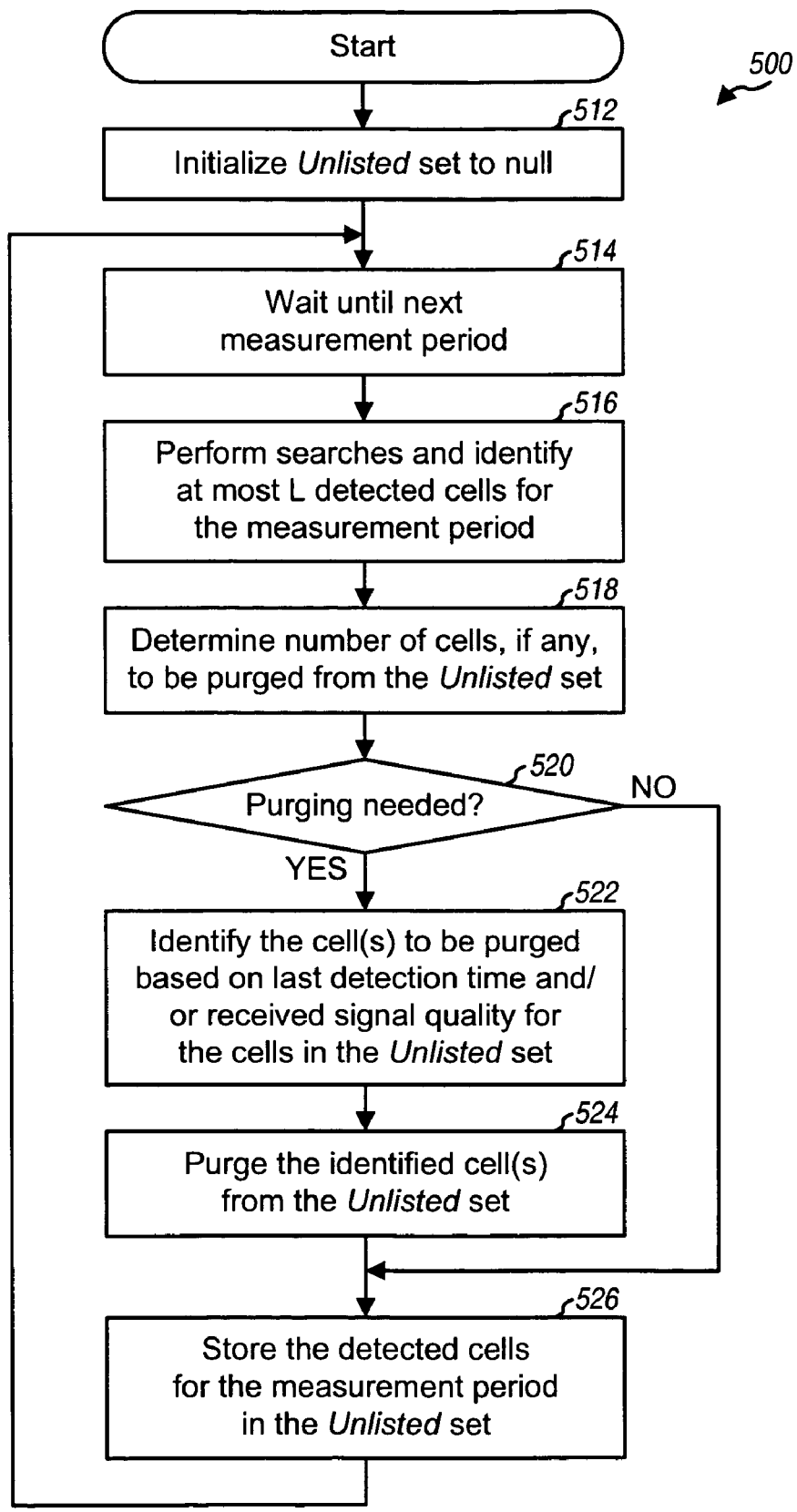
FIG. 5 shows a process for maintaining a set of detected cells.

FIG. 5 shows a flow diagram of a process 500 for maintaining the Unlisted set. The wireless device initializes the Unlisted set to null or empty (block 512). The wireless device then waits until the next measurement period for the Unlisted set or the Unknown Timing Neighbor set (block 514).

When the next measurement period arrives, the wireless device performs searches and identifies at most L detected cells for this measurement period (block 516). The wireless device then determines the number of cells, if any, to be purged from the Unlisted set (block 518). The number of cells to purge is determined by (1) the number of newly detected cells for the measurement period and (2) the number of cells already stored in the Unlisted set at the start of the measurement period. The wireless device may populate the Unlisted set with cells detected by the searches until the number of detected cells in the set reaches L. Once the Unlisted set reaches the limit of L, the wireless device purges the oldest and/or weakest detected cells from the set in order to make room for newly detected cells.

If purging is needed, as determined in block 520, then the wireless device identifies the cell(s) to purge based on the detection time and/or received signal quality for the L cells currently stored in the Unlisted set (block 522). The wireless device then purges the identified cell(s) from the Unlisted set (block 524). After purging the identified cell(s) or if purging is not needed, the wireless device stores the detected cells for the measurement period in the Unlisted set (block 526). The wireless device then returns to block 514 and waits for the next measurement period.

As an example, the wireless device may sort the cells in the Unlisted set such that the latest detected cells are at the top and the oldest detected cells are at the bottom. Cells with the same detection time are sorted by their received signal quality, with cells having higher received signal quality being placed on top. With this structure, the wireless device may sort the cells (if any) detected in the current measurement period based on the received signal quality for these cells, e.g., from highest to lowest. The wireless device then removes cells currently stored in the Unlisted set that are also detected in the current measurement period. The wireless device then purges as many additional cells as needed, starting from the bottom of the Unlisted set. The wireless device then places the detected cells for the current measurement period (sorted by received signal quality) at the top of the Unlisted set.

The searches performed by the wireless device are dependent on the pilot and synchronization information transmitted by each cell in the system. Exemplary list and full searches for W-CDMA are described below.

Figure 6A:
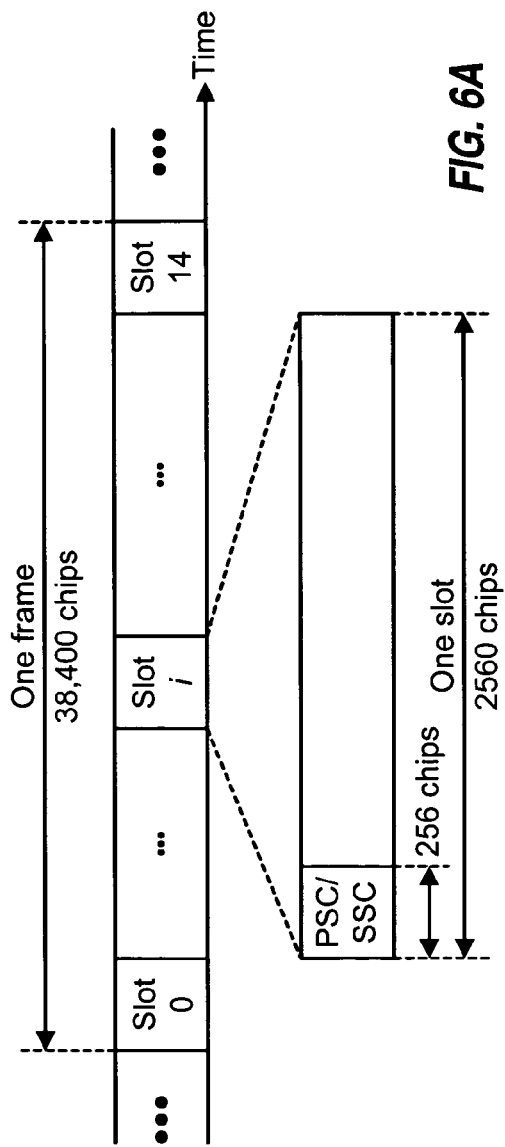
FIG. 6A shows a frame structure used by Wideband-CDMA (W-CDMA)

FIG. 6A shows a frame structure used by W-CDMA. Data is transmitted in frames. Each frame has a duration of 10 ms or 38,400 chips, where each chip has a duration of 260 nano seconds (ns). Each frame is further partitioned into 15 slots that are given indices of 0 through 14. Each slot has a duration of 0.67 ms or 2560 chips.

Figure 6B:
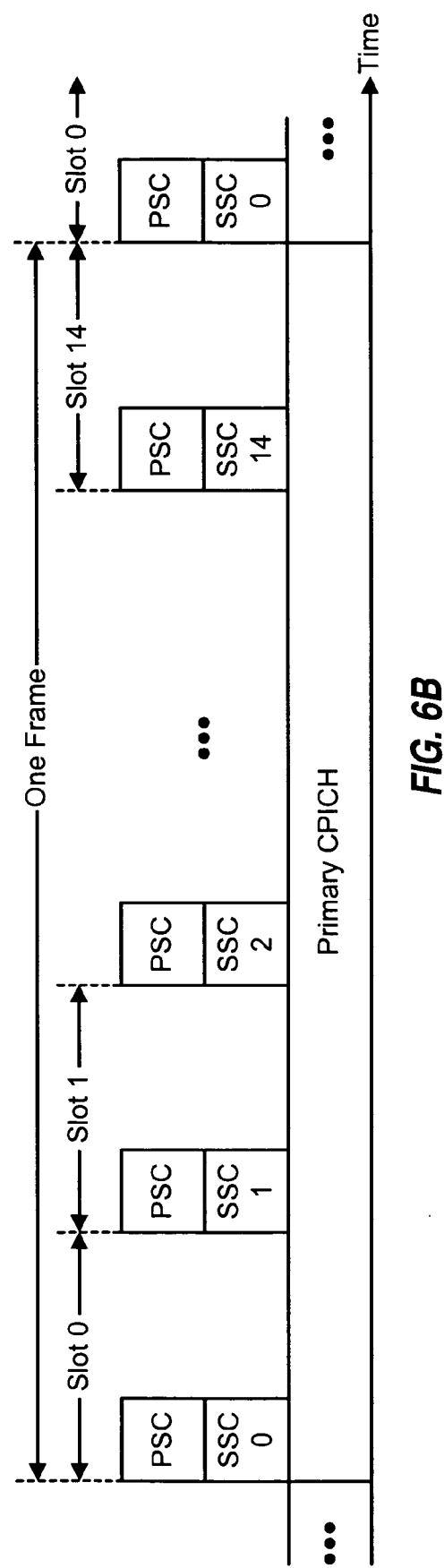
FIG. 6B shows a primary common pilot channel (CPICH) and a synchronization channel (SCH) for the downlink in W-CDMA.

FIG. 6B shows the transmission of the synchronization channel (SCH) and the primary CPICH on the downlink by each cell. The SCH includes a primary SCH and a secondary SCH. The primary SCH carries a fixed 256-chip primary synchronization code (PSC) sequence in the first 256 chips of each 2560-chip slot. All cells in the system use the same PSC. The secondary SCH carries a different 256-chip secondary synchronization code (SSC) sequence in the first 256 chips of each slot in one frame. Fifteen different SSCs are used for the fifteen slots of one frame, and the SSC for each slot is selected from among a set of 16 SSCs available in the system. Each cell is assigned one pattern of 15 SSCs and uses this SSC pattern for the secondary SCH for each frame. The PSC, SSCs, and SCH are described in a document 3GPP TS 25.211, entitled "Physical Channels and Mapping of Transport Channels onto Physical Channels (FDD)," which is publicly available.

Each cell is assigned one primary scrambling code selected from among 512 primary scrambling codes available in the system. The 512 scrambling codes are arranged into 64 groups, and each group contains eight scrambling codes. Each scrambling code group is associated with a different SSC pattern. The 64 scrambling code groups are associated with 64 different SSC patterns. Each cell transmits a continuous pilot on the primary CPICH using the primary scrambling code assigned to that cell.

The wireless device may perform full searches to detect for the presence of cells and ascertain the timing of these cells. The full search for W-CDMA may be performed using a three-step search process.

In step one, the wireless device searches for the PSC by correlating the received samples at the device with the 256-chip PSC sequence at different time offsets (e.g., at every half-chip, or at 5120 different time offsets in one slot). The PSC is detected for each time offset in which the correlation result is sufficiently high (e.g., exceeds a predetermined threshold). The wireless device uses the PSC to detect for the presence of a cell and to ascertain the slot timing for the cell. If the cells in the system are asynchronous, then the PSCs for these cells may be detected at any time offset.

In step two, the wireless device determines the pattern of SSCs used by each cell for which the PSC has been detected. The wireless device determines which one of the 16 possible SSCs was received for each of 15 consecutive slots. The 16 possible SSCs and the PSC are orthogonal to one another. The wireless device can thus correlate the received samples for a given slot with each of the 16 possible SSCs to determine which SSC was used for that slot. The wireless device obtains 15 SSCs used for 15 consecutive slots. The 64 possible SSC patterns are selected such that no SSC pattern is a cyclic shift of any of the other 63 SSC patterns or any non-trivial cyclic shift of itself. Because of this property, the wireless device can ascertain which one of the 64 possible SSC patterns was transmitted based on 15 SSCs detected in any 15 consecutive slots. The wireless device can determine frame timing and the scrambling code group used for the cell based on the detected SSC pattern.

In step three, the wireless device determines the scrambling code used by each cell for which the SSC pattern has been detected. Since each SSC pattern is associated with a specific group of eight scrambling codes, the wireless device evaluates each of the eight scrambling codes to determine which one was used by the cell. For this evaluation, the wireless device correlates the received samples with each scrambling code, accumulates the energies over some number of chips, and compares the accumulated energy against a threshold.

The full search described above can detect for cells whose identities are known to the wireless device (e.g., sent by the system) as well as cells whose identities are not known to the wireless device. Cells detected by the full search and included in the neighbor list are placed in the Known Timing Neighbor set. Cells detected by the full search and not included in the neighbor list are placed in the Unlisted set.

A signal transmitted by a given cell may reach the wireless device via one or multiple signal paths. Each signal path is associated with a propagation delay and a complex channel gain. The wireless device typically employs a rake receiver that includes multiple (M) demodulation elements (which are often called "fingers") and one or more searchers. The searcher(s) search for strong signal instances (or multipaths) from cells in the system. The M fingers are assigned to demodulate and process up to M strongest multipaths for the serving cell(s).

The wireless device performs list searches to identify the strong multipaths for cells with known timing. For a list search for a given cell, the wireless device correlates the received sample with the known scrambling code for that cell at different time offsets, which may be selected based on the known timing for the cell. The wireless device performs the list searches for the serving cell(s) at every measurement period of $P_1$ ms to identify up to M strongest multipaths for the serving cell(s). The wireless device may then assign a finger to each of these multipaths. The wireless device performs list searches for non-serving cells with known timing to determine the received signal quality for these cells. The received signal quality for each neighbor cell may be determined by the summing over all multipaths detected for the cell. The wireless device can perform a list search more quickly than a full search since the detection for the PSC and SSCs can be omitted.

Figure 7:
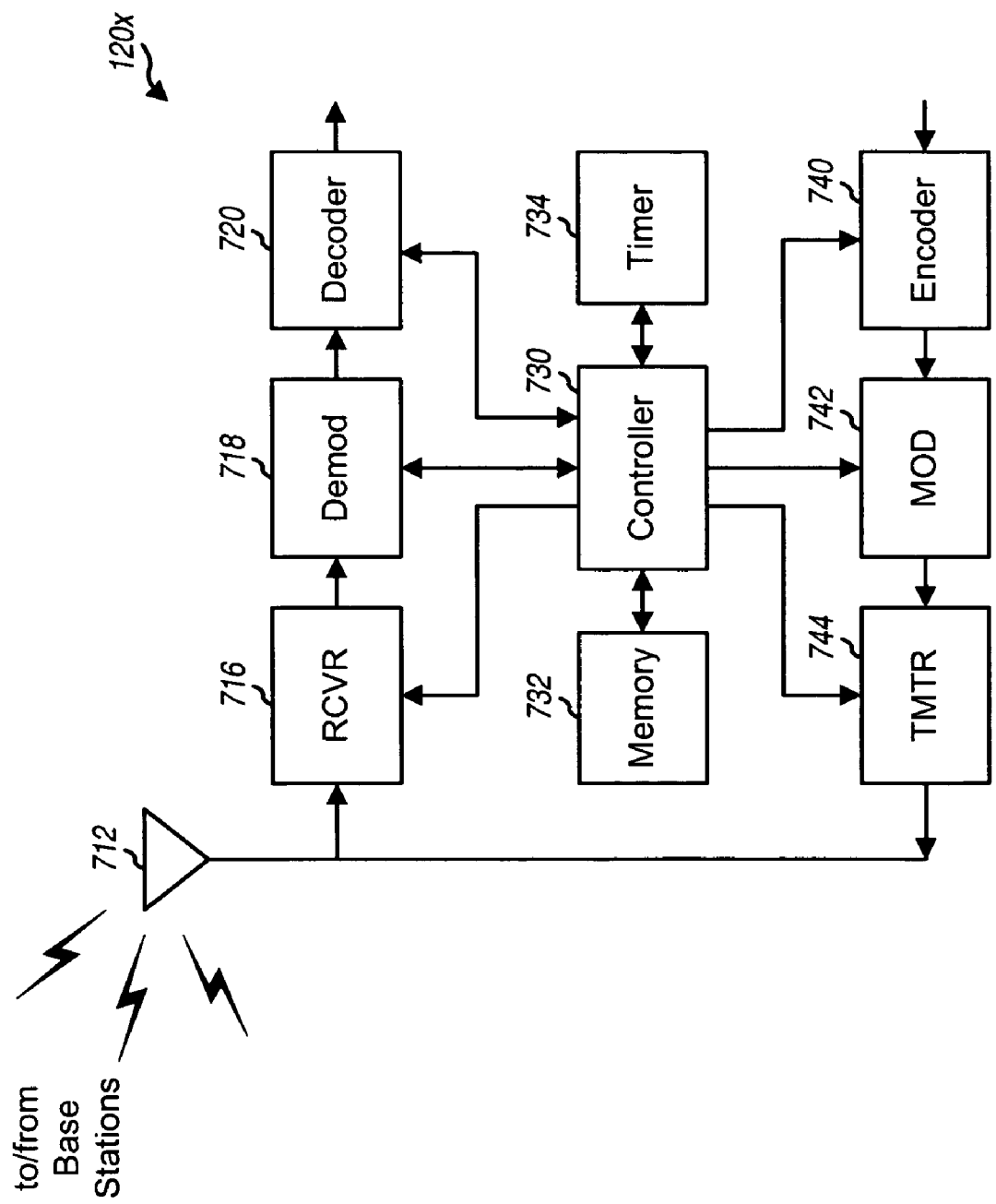
FIG. 7 shows a block diagram of a wireless device.

FIG. 7 shows a block diagram of an embodiment of wireless device 120x, which is one of the wireless devices in FIG. 1. On the downlink, an antenna 712 receives downlink signals from base stations (or cells) and provides a received signal to a receiver unit (RCVR) 716. Receiver unit 716 conditions (e.g., filters, amplifies, and frequency downconverts) the received signal, digitizes the conditioned signal, and provides received samples. A demodulator (Demod) 718 processes the data samples and provides demodulated data. A decoder 720 then deinterleaves and decodes the demodulated data and provides decoded data. The processing by demodulator 718 and decoder 720 is typically different for different radio access technologies. For cell measurement in W-CDMA, demodulator 718 may perform the list and full searches for serving and non-serving cells. For example, demodulator 718 may process (1) the primary SCH to obtain slot timing of a cell, (2) the secondary SCH to obtain frame timing and the scrambling code group for the detected cell, and (3) the CPICH to measure the received signal quality for the detected cell. For data demodulation in W-CDMA, demodulator 718 may perform descrambling with the primary scrambling code assigned to a cell being received, despreading with orthogonal variable spreading factor (OVSF) codes for the channel being processed, data demodulation, and so on.

On the uplink, data (e.g., measurement reports) to be transmitted by wireless device 120x is processed (e.g., encoded and interleaved) by an encoder 740 and further processed (e.g., modulated) by a modulator (MOD) 742 in accordance with the applicable radio access technology (e.g., W-CDMA). A transmitter unit (TMTR) 744 conditions the modulated data to generate an uplink signal, which is transmitted via antenna 712 to one or more base stations for the serving cell(s).

A controller 730 directs operation of various processing units within wireless device 120x. A memory unit 732 stores data and program codes used by controller 730 and other processing units.

For cell measurement, controller 730 maintains various cell sets, manages transition of cells among these sets, and directs searches for cells at the appropriate rates and time. Controller 730 may implement processes 400 and 500 in FIGS. 4 and 5, respectively, and/or other processes for cell measurement. Controller 730 may receive various types of information from other processing units such as, for example, measurement results for cells (e.g., from demodulator 718), the active set and neighbor list sent by the system (e.g., from decoder 720), timing information for the wireless device (e.g., from a timer 734), and so on. Controller 730 may populate the Active set and the Unknown Timing Neighbor set with the cells in the active set and the neighbor list, respectively. Controller 730 may move the cells among the various sets based on the measurement results obtained for these cells and may generate measurement reports, as necessary. Timer 734 may maintain a timer for each cell set and provide an indication whenever the time for the set expires, indicating that measurements for the cells in that set are to be made. Controller 730 may direct searches for cells in each set whenever the timer for that set expires, as indicated by timer 734.

The cell measurement techniques described herein may be implemented by various means. For example, these techniques may be implemented in hardware, software, or a combination thereof. For a hardware implementation, the processing units used to perform cell measurements may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the cell measurement techniques may be implemented with modules (e.g., procedures, functions, and so on) that perform the functions described herein. The software codes may be stored in a memory unit (e.g., memory unit 732 in FIG. 7) and executed by a processor (e.g., controller 730). The. memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus in a wireless communication system, comprising:
    a controller operative to categorize a plurality of cells with known timing into a plurality of sets, each set being associated with a particular rate for performing measurements for cells in the set, and wherein the plurality of sets of cells with known timing are associated with a plurality of different measurement rates; and
    a demodulator operative to perform measurements for the cells in each set at the measurement rate for the set.

2. The apparatus of claim 1, wherein the cells in the system are operated asynchronously, and wherein the controller is further operative to categorize neighbor cells with unknown timing into at least one set.

3. The apparatus of claim 2, wherein the plurality of sets include a first set with at least one serving cell and a second set of neighbor cells with known timing.

4. The apparatus of claim 3, wherein the controller is further operative to initiate measurements for the at least one serving cell at a first rate, initiate measurements for the neighbor cells with known timing at a second rate that is less frequent than the first rate, and initiate measurements for the neighbor cells with unknown timing at a third rate that is less frequent than the second rate.

5. An apparatus in a wireless communication system, comprising:
    a controller operative to categorize a plurality of cells into a plurality of sets, each set being associated with a particular rate for performing measurements for cells in the set, wherein the plurality of sets are associated with a plurality of different measurement rates, wherein the plurality of sets include a first set with at least one serving cell, a second set of neighbor cells with known timing, a third set of neighbor cells with unknown timing, and a fourth set with candidate cells deemed to be good candidates for handoff, and wherein the controller is further operative to initiate measurements for the at least one serving cell at a first rate, initiate measurements for the neighbor cells with known timing at a second rate that is less frequent than the first rate, initiate measurements for the neighbor cells with unknown timing at a third rate that is less frequent than the second rate, and initiate measurements for the candidate cells at a fourth rate that is as frequent or more frequent than the second rate; and a demodulator operative to perform measurements for the cells in each set at the measurement rate for the set.

6. The apparatus of claim 5, wherein the candidate cells include neighbor cells in the second set with high received signal quality.

7. The apparatus of claim 5, wherein the candidate cells include cells recently removed from the first set.

8. The apparatus of claim 5, wherein the plurality of sets further include a fifth set with detected cells that are not identified as neighbor cells by the system, and wherein the controller is further operative to initiate measurements for the detected cells at a fifth rate that is more frequent than the third rate.

9. The apparatus of claim 8, wherein the controller is further operative to limit the fifth set to a predetermined number of detected cells and to purge cells in the fifth set, as needed, based on detection time and received signal quality for the cells in the fifth set.

10. The apparatus of claim 1, wherein the measurement rate for each set is selected based on likelihood of the cells in the set being assigned for communication.

11. The apparatus of claim 2, wherein the measurement rate for each set is selected based on amount of processing to perform measurements for the cells in the set.

12. A method of performing measurements for cells in a wireless communication system, comprising:

categorizing a plurality of cells with known timing into a plurality of sets, each set being associated with a particular rate for performing measurements for cells in the set, and wherein the plurality of sets of cells with known timing are associated with a plurality of different measurement rates; and performing measurements for the cells in each set at the measurement rate for the set.

13. The method of claim 12, wherein the plurality of sets include a first set with at least one serving cell and a second set of neighbor cells with known timing, wherein the method further comprises categorizing neighbor cells with unknown timing into a third set, and wherein measurements for the at least one serving cell are made at a first rate, measurements for the neighbor cells with known timing are made at a second rate that is less frequent than the first rate, and measurements for the neighbor cells with unknown timing are made at a third rate that is less frequent than the second rate.

14. A method of performing measurements for cells in a wireless communication system, comprising:

categorizing a plurality of cells into a plurality of sets, each set being associated with a particular rate for performing measurements for cells in the set, wherein the plurality of sets are associated with a plurality of different measurement rates, wherein the plurality of sets include a first set with at least one serving cell, a second set of neighbor cells with known timing, a third set of neighbor cells with unknown timing, and a fourth set with candidate cells deemed to be good candidates for handoff, and wherein measurements for the at least one serving cell are made at a first rate, measurements for the neighbor cells with known timing are made at a second rate that is less frequent than the first rate, measurements for the neighbor cells with unknown timing are made at a third rate that is less frequent than the second rate, and measurements for the candidate cells are made at a fourth rate that is as frequent or more frequent than the second rate; and performing measurements for the cells in each set at the measurement rate for the set.

15. The method of claim 14, wherein the plurality of sets further include a fifth set with detected cells that are not identified as neighbor cells by the system, and wherein measurements for the detected cells are made at a fifth rate that is more frequent than the third rate.

16. An apparatus in a wireless communication system, comprising:

means for categorizing a plurality of cells with known timing into a plurality of sets, each set being associated with a particular rate for performing measurements for cells in the set, and wherein the plurality of sets of cells with known timing are associated with a plurality of different measurement rates; and means for performing measurements for the cells in each set at the measurement rate for the set.

17. The apparatus of claim 16, wherein the plurality of sets include a first set with at least one serving cell and a second set of neighbor cells with known timing, wherein the apparatus further comprises means for categorizing neighbor cells with unknown timing into a third set, and wherein measurements for the at least one serving cell are made at a first rate, measurements for the neighbor cells with known timing are made at a second rate that is less frequent than the first rate, and measurements for the neighbor cells with unknown timing are made at a third rate that is less frequent than the second rate.

18. An apparatus in a wireless communication system, comprising:

means for categorizing a plurality of cells into a plurality of sets, each set being associated with a particular rate for performing measurements for cells in the set, wherein the plurality of sets are associated with a plurality of different measurement rates, wherein the plurality of sets include a first set with at least one serving cell, a second set of neighbor cells with known timing, a third set of neighbor cells with unknown timing, and a fourth set with candidate cells deemed to be good candidates for handoff, and wherein measurements for the at least one serving cell are made at a first rate, measurements for the neighbor cells with known timing are made at a second rate that is less frequent than the first rate, measurements for the neighbor cells with unknown timing are made at a third rate that is less frequent than the second rate, and measurements for the candidate cells are made at a fourth rate that is as frequent or more frequent than the second rate; and means for performing measurements for the cells in each set at the measurement rate for the set.

19. The apparatus of claim 18, wherein the plurality of sets further include a fifth set with detected cells that are not identified as neighbor cells by the system, and wherein measurements for the detected cells are made at a fifth rate that is more frequent than the third rate.

20. A processor readable media for storing instructions operable in a wireless device to:
categorize a plurality of cells with known timing into a plurality of sets, each set being associated with a particular rate for performing measurements for cells in the set, and wherein the plurality of sets of cells with known timing are associated with a plurality of different measurement rates; and
initiate measurements for the cells in each set at the measurement rate for the set.

21. An apparatus in a wireless communication system, comprising:
a demodulator operative to perform searches to detect for cells in the system; and
a controller operative to identify cells detected by the searches and not signaled by the system, store the detected cells in a set, and purge cells in the set, if needed, to limit the set to a predetermined number of detected cells.

22. The apparatus of claim 21, wherein the controller is further operative to purge cells in the set, if needed, based on detection time for the cells in the set.

23. The apparatus of claim 21, wherein the controller is further operative to purge cells in the set, if needed, based on received signal quality for the cells in the set.

24. The apparatus of claim 21, wherein the cells in the set have asynchronous timing.

25. The apparatus of claim 21, wherein the wireless communication system is a Code Division Multiple Access (CDMA) system.

26. The apparatus of claim 21, wherein the wireless communication system is a Wideband Code Division Multiple Access (W-CDMA) system.

27. The apparatus of claim 21, wherein the controller is further operative to
determine whether to purge any cells currently stored in the set in order to make room for cells detected in a current measurement period, and
if cells are to be purged from the set, identify at least one cell to purge based on last detection time and received signal quality for the cells currently stored in the set.

28. The apparatus of claim 27, wherein the controller is further operative to
sort the cells currently stored in the set based on last detection time and received signal quality for the cells,
select cells for purging starting with oldest detection time, and
if multiple cells have equal detection time, select cells for purging starting with lowest received signal quality.

29. A method of maintaining cells in a wireless communication system, comprising:
performing searches to detect for cells in the system;
identifying cells detected by the searches and not signaled by the system;
storing the detected cells in a set; and
purging cells in the set, if needed, to limit the set to a predetermined number of detected cells.

30. The method of claim 29, further comprising:
determining whether to purge any cells currently stored in the set in order to make room for cells detected in a current measurement period; and
if cells are to be purged from the set, identifying at least one cell to purge based on last detection time and received signal quality for the cells currently stored in the set.

31. An apparatus in a wireless communication system, comprising:
means for performing searches to detect for cells in the system;
means for identifying cells detected by the searches and not signaled by the system;
means for storing the detected cells in a set; and
means for purging cells in the set, if needed, to limit the set to a predetermined number of detected cells.

32. The apparatus of claim 31, further comprising:
means for determining whether to purge any cells currently stored in the set in order to make room for cells detected in a current measurement period; and
means for, if cells are to be purged from the set, identifying at least one cell to purge based on last detection time and received signal quality for the cells currently stored in the set.

33. The apparatus of claim 31, wherein the means for purging cells in the set comprises
means for purging cells in the set, if needed, based on detection time for the cells in the set.

34. The apparatus of claim 31, wherein the means for purging cells in the set comprises
means for purging cells in the set, if needed, based on received signal quality for the cells in the set.

35. A method of performing measurements for cells in a wireless communication system, comprising:
performing searches to detect for cells in the system;
identifying cells detected by the searches and not signaled by the system;
storing the detected cells in a set; and
purging cells in the set, if needed, to limit the set to a predetermined number of detected cells.

36. The method of claim 35, wherein the purging cells in the set comprises purging cells in the set, if needed, based on detection time for the cells in the set.

37. The method of claim 35, wherein the purging cells in the set comprises purging cells in the set, if needed, based on received signal quality for the cells in the set.

38. A processor readable media for storing instructions operable in a wireless device to:
initiate searches to detect for cells in a wireless communication system;
identify cells detected by the searches and not signaled by the system;
direct storage of the detected cells in a set; and
purge cells in the set, if needed, to limit the set to a predetermined number of detected cells.

39. The processor readable media of claim 38, and further for storing instructions operable to:
purge cells in the set, if needed, based on detection time for the cells in the set.

40. The processor readable media of claim 38, and further for storing instructions operable to:
purge cells in the set, if needed, based on received signal quality for the cells in the set.

* * * * *